United States Patent Office 3,056,785
Patented Oct. 2, 1962

3,056,785
PURINE DERIVATIVES
George H. Hitchings, Yonkers, and Gertrude B. Elion, Bronxville, N.Y., assignors to Burroughs Wellcome & Co. (U.S.A.) Inc., Tuckahoe, N.Y., a corporation of New York
No Drawing. Filed Mar. 21, 1960, Ser. No. 16,203
8 Claims. (Cl. 260—252)

The present invention relates to a new group of di-heterocyclic sulfides, containing at least one purine moiety. These substances may be represented by the following formula:

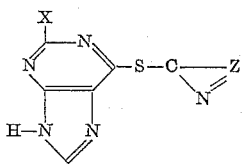

wherein X is selected from the group consisting of hydrogen and amino and Z is a chain of three to four atoms necessary to complete a monocyclic nitrogen containing heterocycle having not over two cyclic nitrogen atoms and having no carbon bound alkyl substituent containing more than one carbon atom in chain length.

This application is a continuation-in-part of application 720,560, now abandoned.

The new substances are useful for their inhibitory effects on certain pathogenic bacteria for which adequate control measures do not presently exist. They are especially valuable by reason of the synergistic action which is exhibited on infectious and pathogenic organisms when they are used in combination with a sulfonamide or other antagonists of p-aminobenzoic acid such as diaminodiphenylsulfone (DDS). This is illustrated below (Table I) wherein it is shown that combinations of the new compositions with DDS produce strong inhibitions of *Proteus vulgaris* (strain 49210 I) at concentrations which, when the drugs are used singly, are non-inhibitory. These combinations may be further combined with antibiotics to form antibacterial preparations for topical use in various ways which will be apparent to those versed in the art.

The new substances are formed by the reaction of a heterocyclic halide with an heterocyclic mercaptan according to the equation:

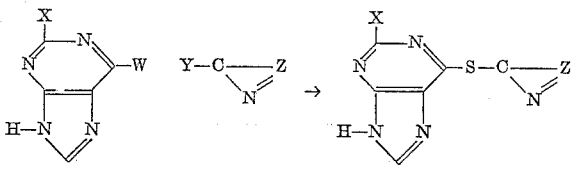

wherein X and Z have the values assigned above and W and Y are selected from the groups consisting of the mercapto group on the one hand and chlorine, bromine and iodine on the other, one being selected from each group. The manner in which these reactions are carried out is illustrated in the examples below. Obviously, the conditions may be varied somewhat in detail e.g. solvent, time and temperature and the examples given are intended to be illustrative only. In practice, the usual solvents are those of high dielectric constant such as water, dimethyl formamide and dimethyl sulfoxide. All of these permit the reaction to be run at about 100°. In principle these reactions should indeed proceed more rapidly in solvents of lower dielectric constants, but since such substances are poorer solvents for the purines they are not practically useful. The course of the reaction can be followed by removing aliquots periodically and examining their ultra violet absorption spectra, since the spectra of the products are quite different from the spectra of the starting materials.

TABLE I

| Quantities in gamma per ml.: | Percent inhibition |
|---|---|
| DDS 4/ml. | 15 |
| DDS 8/ml. | 25 |
| DDS 16/ml. | 55 |
| Compound 10/ml.+DDS 4/ml. | -- |
| Example 1, DDS 4/ml. | 64 |
| Example 2, DDS 4/ml. | 54 |
| Example 3, DDS 4/ml. | 59 |
| Example 4, DDS 4/ml. | 81 |
| Example 6, DDS 4/ml. | 85 |
| Example 8, DDS 4/ml. | 87 |
| Example 9, DDS 4/ml. | 69 |
| Example 10, DDS 4/ml. | 69 |
| Example 11, DDS 4/ml. | 73 |
| Example 13, DDS 4/ml. | 46 |

At these concentrations the compounds of Examples 1 to 13 do not individually produce significant inhibition of the organisms.

EXAMPLE 1

6,6-Bis purinyl sulfide

A solution of 25 g. of 6-iodopurine and 16.8 g. of 6-mercaptopurine hydrate in 100 ml. of 2 N sodium hydroxide was heated on the steam bath for 24 hours. The reaction mixture was cooled and neutralized with acetic acid. The yellow precipitate of 6,6-bis-purinyl sulfide dihydrate (22 g.) was collected, washed with water and dried in a vacuum desiccator. The U.V. absorption spectrum shows $\lambda$ max.=275, 308 m$\mu$ at pH 1, $\lambda$ max.=285, 312 m$\mu$ at pH 11.

EXAMPLE 2

6-(4'-pyrimidyl)mercaptopurine

A solution of 2.5 g. of 6-iodopurine and 1.12 g. of 4-mercaptopyrimidine in 10 ml. of 2 N sodium hydroxide was heated on the steam bath for 24 hours. The reaction mixture was then treated as in Example 1. The 6-(4'-pyrimidyl)mercaptopurine, M.P. 184–185°, dec., has an U.V. spectrum with $\lambda$ max.=273, 300 m$\mu$ at pH 1, $\lambda$ max.=280, 305 m$\mu$ at pH 11.

EXAMPLE 3

6-(2'-Amino-6'-Purinyl)Mercaptopurine

A solution of 7.3 g. of 6-thioguanine and 10 g. of 6-iodopurine in 60 ml. of 2 N sodium hydroxide was treated as in Example 1. The 6-(2'-amino-6'-purinyl)-mercaptopurine did not melt >325°. Its U.V. absorption spectrum showed $\lambda$ max.=270, 302, 330 m$\mu$ at pH 1, $\lambda$ max.=287, 328 m$\mu$ at pH 11.

EXAMPLE 4

6-(2'-Hydroxy-4'-Pyrimidyl)Mercaptopurine

A solution of 10 g. of 6-iodopurine and 5.12 g. of 4-thiouracil in 60 ml. of 2 N sodium hydroxide was treated as in Example 1. The product, 6,(2'-hydroxy-4-pyrimidyl)mercaptopurine, has a U.V. spectrum with $\lambda$ max.=320 m$\mu$ at pH 1 and $\lambda$ max.=310 m$\mu$ at pH 11.

EXAMPLE 5

6-(3'-Chloro-6'-Pyridazyl)Mercaptopurine

A mixture of 3 g. of 6-mercaptopurine, 3 g. of 3,6-dichloropyridazine and 1.64 g. of anhydrous sodium acetate in 75 ml. of dry dimethylsulfoxide was heated at 125° for 4 hours, with a drying tube on top of the condenser. After standing overnight at room temperature, the reaction mixture was poured into 300 ml. of water and chilled. The product, 6-(3'-chloro-6'-pyridazyl)mercaptopurine was collected, washed with water and dried at room temperature. Its U.V. spectrum showed λ max.= 290 mμ at pH 1 and λ max.=295 mμ at pH 11.

EXAMPLE 6

6-(1'-Methyl-4'-Nitro-5'-Imidazolyl)Mercaptopurine

A mixture of 4.6 g. of anhydrous 6-mercaptopurine, 5 g. of 1-methyl-4-chloro-5-nitroimidazole and 2.5 g. of anhydrous sodium acetate in 100 ml. of dry dimethyl sulfoxide was heated at 100° for 7 hours. After standing overnight at room temperature, the mixture was poured into 200 ml. of cold water and the yellow precipitate of 6-(1'-methyl-4'-nitro-5'-imidazolyl)mercaptopurine (7.0 g.) collected. After recrystallization from 50% aqueous acetone, the product melted at 243–244°, dec., and had an U.V. spectrum with λ max.=280 mμ at pH 1 and λ max.=285 mμ at pH 11.

EXAMPLE 7

6-(5'-Nitro-4',6'-Pyrimidyl-bis)Mercaptopurine

A mixture of 6 g. of anhydrous 6-mercaptopurine, 3.84 g. of 4,6-dichloro-5-nitropyrimidine and 3.3 g. of anhydrous sodium acetate in 150 ml. of dry dimethyl sulfoxide was heated at 100° for 5 hours. The reaction mixture was poured into 400 ml. of cold water and the yellow precipitate of 6-(5'-nitro-4',6'-pyrimidyl-bis)mercaptopurine collected (5.0 g.). The compound has a U.V. spectrum with λ max.=260, 360 mμ at pH 1 and λ max.= 275, 390 mμ at pH 11.

EXAMPLE 8

2-Amino-6-(1'-Methyl-4'-Nitro-5'-Imidazolyl)-Mercaptopurine

A mixture of 5 g. of thioguanine, 5 g. of 1-methyl-4-nitro-5-chloroimidazole, 2.5 g. of anhydrous sodium acetate in 200 ml. of dry dimethyl sulfoxide was heated at 110° for 5 hours, cooled and poured into 300 ml. of water. The product, 2-amino-6-(1'-methyl-4'-nitro-5'-imidazolyl)mercaptopurine (5.8 g.), was collected, washed with water and dried at room temperature. It decomposes slowly >200° and has a U.V. spectrum with λ max.=320 mμ at pH 1 and λ max.=315 mμ at pH 11.

EXAMPLE 9

6-(2'-Quinolyl)Mercaptopurine

A solution of 5.3 g. of 2-mercaptoquinoline and 6.6 g. of 6-iodopurine in 33 ml. of 2 N sodium hydroxide was heated on the steam bath for 24 hours. After cooling, the solution was neutralized with acetic acid and the 6-(2'-quinolyl)mercaptopurine collected. It has a U.V. spectrum with λ max.=240, 280 and 348 mμ at pH 1, λ max.=295, 325 mμ at pH 11.

EXAMPLE 10

6-(2'-Pyridyl)Mercaptopurine

A solution of 5 g. of 6-iodopurine and 2.2 g. of 2-mercaptopyridine in 20 ml. of 2 N sodium hydroxide was heated on the steam bath for 24 hours and the product was isolated as in Example 1. The 6-(2'-pyridyl)mercaptopurine has a U.V. spectrum with λ max.=277, 312 mμ at pH 1 and λ max.=298 mμ at pH 11.

EXAMPLE 11

6-(4'-Nitro-5'-Imidazolyl)Mercaptopurine

A solution of 770 mg. of 6-iodopurine and 500 mg. of the ammonium salt of 4-nitro-5-mercaptoimidazole in 6 ml. of 1 N sodium hydroxide was heated on the steam bath for 24 hours. On cooling the product, 6-(4'-nitro-5'-imidazolyl)mercaptopurine, precipitated as yellow crystals. The compounds decomposed at 220° and had a U.V. spectrum with λ max.=282, 345 mμ at pH 1, λ max.=290, 388 mμ at pH 11.

EXAMPLE 12

6-(4'-Nitro-5'-Imidazolyl)Mercaptopurine

A solution of 500 mg. of 6-mercaptopurine and 580 mg. of 4-nitro-5-bromoimidazole in 6 ml. of 1 N sodium hydroxide was heated on the steam bath for 24 hours. The product precipitated on cooling and was identical in all respects to the one isolated in Example 11.

EXAMPLE 13

2-Amino-6-(4'-Nitro-5'-Imidazolyl)Mercaptopurine

A solution of 1.5 g. of 6-thioguanine and 1.75 g. of 4-nitro-5-bromoimidazole in 13.5 ml. of 2 N sodium hydroxide was heated on the steam bath for 48 hours. On cooling, the 2-amino-6-(4'-nitro-5'-imidazolyl)mercaptopurine precipitated. Its U.V. absorption spectrum showed λ max.=325 mμ at pH 1 and λ max.=312, 390 mμ at pH 11.

EXAMPLE 14

6-(4'-Nitro-5'-Imidazolyl)Mercaptopurine

A solution of 310 mg. of 6-chloropurine and 320 mg. of 4-mercapto-5-nitroimidazole in 4 ml. of 1 N sodium hydroxide was heated on the steam bath. The product which precipitated was identical in all respects with the one isolated in Examples 11 and 12.

EXAMPLE 15

6-(4'-Methyl-2'-Thiazolyl)Mercaptopurine

A solution of 1 g. of 2-mercapto-4-methyl-thiazole and 1.87 g. 6-iodopurine in 20 ml. of 1 N NaOH was heated on the steam bath for 46 hours, then cooled and acidified to pH 7.5. The precipitate which formed on chilling was collected and dissolved in 200 parts of boiling 50% aqueous acetone, filtered and the acetone removed under reduced pressure. The precipitate which formed on removal of acetone was collected, dried and leached with 60 parts of ether. The pure crystalline 6-(4'-methyl-2'-thiazolyl)mercaptopurine then melted at 170–171°.

EXAMPLE 16

2-Amino-6-(1'-p-Nitrobenzyl-4'-Nitro-5'-Imidazolyl)Mercaptopurine

A solution containing 780 mg. of thioguanine and 1.6 g. of 1-p-nitrobenzyl-4-nitro-5-bromoimidazole in 10 ml. of 1 N sodium hydroxide and 5 ml. of ethanol was heated on the steam bath for 4 hours. The mixture was cooled, adjusted to pH 5 with hydrochloric acid and the precipitate was collected. The 2-amino-6-(1'-p-nitrobenzyl-4'-nitro-5'-imidazolyl)mercaptopurine, after re-solution in alkali and reprecipitation with acetic acid, precipitated as the dihydrate, dec. >210° C.

EXAMPLE 17

2-Amino-6-(1'-Methyl-2'-Carboxy-4'-Nitro-5'-Imidazolyl)Mercaptopurine

A mixture of 1.8 g. of thioguanine, 2 g. of 1-methyl-2-carboxy-4-nitro-5-chloroimidazole and 1.8 g. of anhydrous sodium acetate in 40 ml. of dry dimethyl sulfoxide was heated at 60° for 18 hours. The mixture was cooled and poured into 150 ml. of cold water. The yellow precipitate (2.85 g.) was collected and purified by solution in 50 ml. of dimethyl sulfoxide, filtration and reprecipitation by dilution with 4 volumes of water. The 2-amino-6-(1'-methyl-2-carboxy-4'-nitro-5'-imidazolyl) mercaptopurine does not melt <300°; its ultraviolet absorption spectrum has a λ max.=322 mμ at pH 1.

EXAMPLE 18

2-Amino-6-(2'-Amino-6'-Purinyl)Mercaptopurine

A solution of 2 g. of thioguanine and 3.1 g. of 2- amino-6-iodopurine in 24 ml. of 1 N sodium hydroxide was heated on the steam bath overnight. The reaction mixture was cooled and adjusted to pH 7 with acetic acid. The precipitate was collected and purified by solution in 1 N sodium hydroxide and reprecipitation with acetic acid. The 2-amino-6-(2'-amino-6'-purinyl)mercaptopurine shows an ultraviolet absorption maximum at 335 mµ at pH 1. It does not melt below 320° C.

EXAMPLE 19

*2,4-Bis-(2'-Amino-6'-Purinylmercapto)-6-Chloropyrimidine*

A mixture of 6.7 g. of thioguanine, 3.64 of 2,4,6-trichloropyrimidine and 3.3 g. of anhydrous sodium acetate in 150 ml. of dry dimethyl sulfoxide was heated overnight on the steam bath. The reaction mixture was cooled, poured into 200 ml. of cold water an dfiltered. The precipitate was purified by solution in dilute sodium hydroxide and reprecipitation by acidification to pH 5. The 2,4-bis - (2 - amino - 6 - purinylmercapto) - 6 - chloropyrimidine forms a dihydrate which decomposes above 260°.

EXAMPLE 20

*2-Amino-6-(1'-Benzyl-4'-Nitro-5'-Imidazolyl) Mercaptopurine*

A solution containing 840 mg. of thioguanine and 1.4 g. of 1-benzyl-4-nitro-bromoimidazole in 7.5 ml. of 1 N sodium hydroxide and 7.5 ml. of ethanol was heated on the steam bath for 20 hours. The solution was chilled and filtered. The precipitate (800 mg.) was purified by solution in 10 ml. of 1 N sodium hydroxide and reprecipitation by acidification with acetic acid. The 2-amino-6-(1'-benzyl-4'-nitro-5'-imidazolyl)mercaptopurine melts at 249°, with decomposition.

What we claim is:
1. 6-(1'-methyl-4'-nitro-5'-imidazolyl)mercaptopurine.
2. 2 - amino - 6 - (1' - methyl - 4' -nitro - 5 ' - imidazolyl)mercaptopurine.
3. 6-(4'-nitro-5'-imidazolyl)mercaptopurine.
4. 2-amino-6-(4'-nitro-5'-imidazolyl)mercaptopurine.
5. 2 - amino - 6 - (1' - methyl - 2' - carboxy - 4' - nitro- 5'-imidazolyl)mercaptopurine.
6. 2 - amino - 6 - (1 - benzyl - 4' - nitro - 5' - imidazolyl)mercaptopurine.
7. A compound of the formula

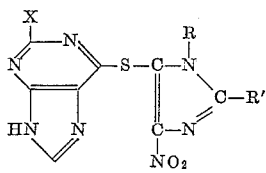

wherein X is selected from the class consisting of hydrogen and amino, R is selected from the class consisting of methyl, benzyl, p-nitrobenzyl and hydrogen and R' is selected from the class consisting of hydrogen and the methyl group.

8. 2 - amino - 6 - (1' - p - nitrobenzyl - 4' - nitro - 5'-imidazolyl)mercaptopurine.

References Cited in the file of this patent

Barker et al.: Jour. Chem. Soc. (London), 1956, pages 917–921.